United States Patent [19]
Bowcott

[11] 3,973,151
[45] Aug. 3, 1976

[54] STATOR ASSEMBLY FOR A DYNAMOELECTRIC MACHINE AND METHOD OF MANUFACTURING SAME

[75] Inventor: Roy Price Bowcott, Solihull, England

[73] Assignee: The Lucas Electrical Company Limited, Birmingham, England

[22] Filed: July 23, 1974

[21] Appl. No.: 490,941

[30] Foreign Application Priority Data
July 25, 1973 United Kingdom............... 35431/73

[52] U.S. Cl. .................................. 310/42; 29/509; 29/522; 29/596; 310/218
[51] Int. Cl.² .......................................... H02K 15/02
[58] Field of Search ............. 29/596, 598, 509, 522; 310/42, 216, 218, 259

[56] References Cited
UNITED STATES PATENTS

| | | | |
|---|---|---|---|
| 231,231 | 8/1880 | Klein..................... | 29/522 |
| 1,275,576 | 8/1918 | Lockwood............. | 29/509 |
| 2,447,048 | 8/1948 | Baker..................... | 29/509 |
| 2,958,230 | 11/1960 | Haroldson.............. | 29/509 |
| 3,021,444 | 2/1962 | Simmons et al. ...... | 310/218 |
| 3,761,754 | 9/1973 | Boesel................... | 310/218 |

FOREIGN PATENTS OR APPLICATIONS

| | | | |
|---|---|---|---|
| 746,360 | 7/1944 | Germany............... | 310/218 |
| 859,497 | 10/1952 | Germany............... | 310/218 |

*Primary Examiner*—Carl E. Hall
*Attorney, Agent, or Firm*—Holman and Stern

[57] ABSTRACT

A method of manufacturing stator assemblies for dynamo electric machines in which the stator assemblies are of the kind including a hollow cylindrical yoke carrying a pole member on its inner surface comprising starting with a pole member having upstanding therefrom an integral spigot, and a yoke member, the wall of which includes a through bore of larger diameter than the spigot, performing a deforming operation on the yoke at the outer end of the bore to enlarge the diameter of the outer end of the bore and at the same time reduce the diameter of the bore intermediate its ends. The intermediate diameter of the bore is reduced to that of the spigot, and the spigot is then inserted through the bore from the inner end thereof so that the pole member lies against the inner surface of the yoke. The free end of the spigot is then deformed to produce a rivet head occupying the outer, enlarged region of the bore, and thus secure the pole member to the yoke.

2 Claims, 5 Drawing Figures

STATOR ASSEMBLY FOR A DYNAMOELECTRIC MACHINE AND METHOD OF MANUFACTURING SAME

BACKGROUND OF THE INVENTION

This invention relates to a method of manufacturing stator assemblies, for dynamo electric machines, of the kind including a hollow cylindrical yoke carrying a pole member on its inner cylindrical surface.

SUMMARY OF THE INVENTION

A method according to the invention includes the steps of, starting with a pole member having upstanding therefrom an integral spigot and a yoke member the wall of which includes a through bore of larger diameter than said spigot, performing a deforming operation on the yoke at the outer end of the bore to enlarge the diameter of the outer end of the bore and at the same time reduce the diameter of the bore intermediate its ends to that of said spigot, inserting said spigot through said bore from the inner end thereof so that the pole member lies against the inner cylindrical surface of the yoke, and deforming the free end of the spigot to produce a rivet head occupying the outer, enlarged region of the bore, and so secure the pole member to the yoke.

BRIEF DESCRIPTION OF THE DRAWINGS

One example of the invention is illustrated in the accompanying drawings wherein.

DETAILED DESCRIPTION OF THE INVENTION

Figure 1:
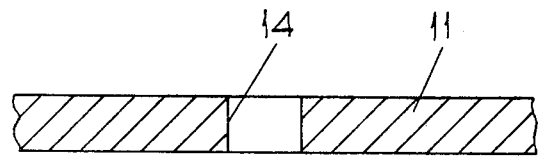
FIGS. 1, 2 and 3 are diagrammatic sectional views illustrating three stages of a method of manufacturing a stator assembly for a dynamo electric machine.
Figure 2:
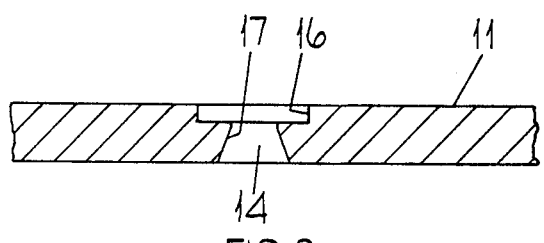
Figure 3:
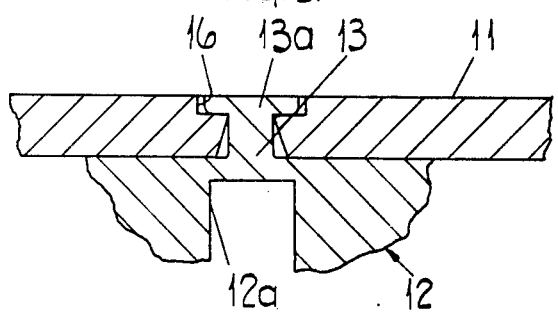

Referring to the drawings, the stator assembly to be constructed includes a hollow cylindrical mild steel yoke 11 and a plurality of mild steel pole members 12 which are to be secured to the yoke, in angularly spaced relationship around the inner, cylindrical surface of the yoke.

In order to secure the pole members to the yoke, each pole member is provided with an integral, upstanding cylindrical spigot or extension 13 and at points determined by the desired position of the pole members, the wall of the yoke 11 is formed with cylindrical through bores 14, the diameter of which is in excess of the diameter of the spigots 13.

Figure 4:
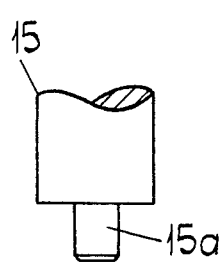
FIG. 4 is a side elevational view of a planishing tool involved in the method.
Figure 5:
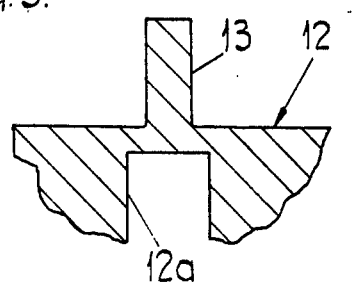
FIG. 5 is a diagrammatic sectional representation of part of a pole member.

The outer end of each of the bores 14 is subject to a planishing operation using a stepped punch 15 (FIG. 4). The planishing operation produces a region 16 of enlarged diameter at the outer end of each bore 14, and the material displaced in producing the enlarged region 16 serves to produce a region 17 of reduced diameter intermediate the ends of each bore 14. The inner end of each bore 14 remains unaffected, and so retains its original diameter. The reduced diameter portion 15a of the punch 15 is almost equal in diameter to the spigots 13, and the planishing operation is such that the regions 17 of the bores 14 are reduced to the diameter of the portion 15a of the punch 15, and so are equal in diameter to the spigots 13.

The planishing operation effectively converts a plane cylindrical bore into a bore having countersunk ends, the diameter of the outer countersink being greater than the diameter of the inner countersink.

The pole members 12 are then inserted into the yoke, and are positioned on the inner cylindrical surface of the yoke with their spigots 13 extending through the deformed bores 14. The faces of the pole members 12 from which the spigots 13 project are curved to correspond to the curved inner surface of the yoke 11 against which they seat. Thus, the matching curvatures of the mutually presented surfaces ensure that the pole members are correctly aligned within the yoke 11. The matching diameters of the spigots 13 and the regions 17 of the bores 14 ensure that the pole members are correctly positioned along the length of the yoke.

Each pole member 12 is supported against the inner surface of the yoke 11 by means of an anvil which is inserted into a recess 12a in the pole member 12, and the free end of each spigot 13 is then subject to a riveting operation which deforms the free end of the spigot 13 to produce a rivet head 13a occupying the enlarged region 16 of the respective bore 14. Thus, the surface of each pole member 12 engages the inner surface of the yoke 11, and each rivet head 13 engages the shoulder defined between the region 16 and the region 17 of its respective bore 14, thereby securing each pole member 12 to the yoke 11 in the correct position.

It will be noted that a clearance is produced between the root of each spigot 13 and the wall of the bore 14. This clearance is important, since the integral spigots 13 will be produced by a pressing operation performed on the pole members 12, and in practice it will be extremely difficult to consistently produce pole members with a right angle interface between the cylindrical surface of the pole member 12 and the cylindrical surface of the respective spigot 13. As the pressing tools wear in use, the interface between the spigot 13 and the pole 12 will become curved, and without the clearance provided by the countersink at the inner end of each bore 14 it would be impossible to seat the cylindrical surface of the pole member 12 against the inner cylindrical surface of the yoke 11. It is to be appreciated that a firm seating of the pole member 12 against the yoke 11 is necessary to ensure a minimum of air gaps in the magnetic flux path of the stator assembly.

It will be appreciated that the deformation operations which are performed both on the yoke and the spigot 13 can be performed in a number of different ways to produce the desired result. For example, the spigot 13 can be peened to produce the head 13a or alternatively could be spun over.

I claim:

1. A method of manufacturing a stator assembly for a dynamo electric machine of the type having a hollow cylindrical yoke member and a pole member supported on the inner cylindrical surface of the yoke member, comprising the steps of starting with a yoke member having a circular bore of uniform diameter and inner and outer ends, and a pole member with an upstanding integral circular extension of a uniform diameter less than the diameter of the cylindrical bore, deforming only the outer end of the cylindrical bore for defining a circular recess having a diameter greater than the diameter of the bore and simultaneously providing an area of lesser diameter than the circular recess and the inner end of the bore by the material displaced in defining the circular recess while retaining the original diameter of the bore between said area and the inner end of the bore, inserting the extension of the pole member into the bore from the inner end thereof such that the pole member lies against the inner cylindrical surface of the yoke whereby the diameters of the extension and said area correctly position the pole member along the length of the yoke member, deforming the free end of the extension to provide a rivet head occupying the circular recess thereby securing the pole member and yoke member together, and maintaining a clearance between the extension and the bore extending from said area to the inner end of the bore to accommodate any increase in diameter of the extension adjacent the pole member.

2. A stator assembly for a dynamo electric machine of the type including a hollow cylindrical yoke having inner and outer surfaces and a pole member carried on the inner surface of the yoke, said yoke having a cylindrical through bore of uniform diameter extending from the inner surface to the outer surface, the end of the bore at the outer surface of the yoke being deformed to provide a circular recess having a diameter greater than the diameter of the through bore and an area of lesser diameter than the circular recess and the inner end of the bore, said pole member having an integral cylindrical extension of uniform diameter less than the diameter of the through bore and matching said area of lesser diameter, said extension being inserted into the through bore through the inner end thereof such that the pole member lies against the inner cylindrical surface of the yoke whereby the matching diameters of the extension and area of lesser diameter correctly position the pole member along the length of the yoke member, the extension having a rivet head occupying the circular recess thereby securing the yoke and pole members together, and a clearance between the through bore and the extension extending between the area of lesser diameter and the inner end of the bore serving to accommodate any increase in diameter of the extension adjacent the pole member.

* * * * *